United States Patent [19]

Quatse et al.

[11] Patent Number: 4,774,656
[45] Date of Patent: Sep. 27, 1988

[54] METHOD AND APPARATUS FOR PROTECTING AND MONITORING THE TRANSMISSION OF INFORMATION BETWEEN THE CENTRAL UNIT OF A PROGRAMMABLE CONTROLLER AND THE SENSORS AND/OR THE ACTUATORS OF THE CONTROLLED PROCESS

[75] Inventors: Jesse T. Quatse, Corte Madera, Calif.; Lionel Heitz, Crolles; Jacky Pergent, Carros Le Neuf; Olivier Penot, Antibes, all of France

[73] Assignee: La Telemecanique Electrique, France

[21] Appl. No.: 704,250

[22] PCT Filed: Jun. 1, 1984

[86] PCT No.: PCT/FR84/00142
§ 371 Date: Feb. 1, 1985
§ 102(e) Date: Feb. 1, 1985

[87] PCT Pub. No.: WO84/04977
PCT Pub. Date: Dec. 20, 1984

[30] Foreign Application Priority Data

Jun. 3, 1983 [FR] France .................. 83 09539

[51] Int. Cl.⁴ .............................................. G06F 9/02
[52] U.S. Cl. .................................. 364/900; 371/16; 371/29

[58] Field of Search ... 364/200 MS File, 900 MS File, 364/713; 371/2, 3, 16, 19, 29, 20, 22, 24, 47, 54, 55, 68, 71; 380/2, 49, 50, 52, 54, 56

[56] References Cited

U.S. PATENT DOCUMENTS

| 4,158,226 | 6/1979 | Struger | 364/900 |
| 4,162,536 | 7/1979 | Morley | 364/200 |
| 4,251,883 | 2/1981 | Grants | 364/900 |
| 4,275,455 | 6/1981 | Bartlett | 364/900 |
| 4,386,400 | 5/1983 | Cope et al. | 364/200 |
| 4,388,697 | 6/1983 | Breen et al. | 364/900 |
| 4,455,653 | 6/1984 | Le Gars et al. | 371/29 |
| 4,510,565 | 4/1985 | Dummermuth | 364/900 |
| 4,535,456 | 8/1985 | Bauer | 364/900 |

*Primary Examiner*—Raulfe B. Zache
*Assistant Examiner*—Emily Y. Chan
*Attorney, Agent, or Firm*—William A. Drucker

[57] ABSTRACT

An input/output device is used for a programmable controller having on input/output cards a plurality of electronic channels forming the logic interfaces between the connection bus with the central unit and the sensors or the actuators connected to the controllers; this device further uses electronic circuits for monitoring the good transmission of input/output signals by the adaptation interfaces providing for the galvanic isolation of the bus with respect to the sensors and actuators of the controlled automatism.

11 Claims, 6 Drawing Sheets

METHOD AND APPARATUS FOR PROTECTING AND MONITORING THE TRANSMISSION OF INFORMATION BETWEEN THE CENTRAL UNIT OF A PROGRAMMABLE CONTROLLER AND THE SENSORS AND/OR THE ACTUATORS OF THE CONTROLLED PROCESS

BACKGROUND OF THE INVENTION

1. Field of the Invention

The present invention relates to a method and apparatus for protecting and monitoring the transmission of information between the central unit of a programmable controller and the sensors and/or actuators of the process controlled by said controller.

2. Description of the Prior Art

Generally, it is known that a programmable controller uses a processor for the commanded control of the actuators of the process as a function of the information supplied by the detectors, according to an operating sequence determined by a programme.

Providing its connection with the process, the controller comprises a plurality of connecting elements broken down into two assemblies, namely:

an assembly of input connecting elements to which the detectors or sensors are connected, and an assembly of output connecting elements to which the actuators of the process are connected.

The processor generally comprises a central unit, usually with microprocessor, in which the transfer of the information takes place through buses (data bus, address bus, control bus). This central unit communicates with the outside and in particular with the input/output connecting elements of the controller by means of input/output circuits connected to the buses generated by the microprocessor.

Generally, these input/output circuits are formed on one or more printed circuit boards each grouping together a predetermined number of input and/or output channels.

Each of these channels ends in a multipole input or output materialized by a pole connecting area on the printed circuit. It will be noted in this connection that very often bipolar inputs and outputs are used and, accessorily, three pole outputs (AC outputs).

The connecting areas may be advantageously disposed along one edge of the printed circuit, on which edge a connecting strip may be connected, for example of the type described in patent application published under No. 2 544 556 on Oct. 19, 1984 in the name of the applicant. This connecting strip is intended more particularly to provide a disconnectable connection between said areas and the corresponding conductors connecting the controller to the detectors and to the actuators of the process.

Thus, in a control of the kind mentioned above, the aim of the invention is first of all to provide input/output circuits in which the inputs and outputs of each of these channels are suitably isolated from the bus conductors of the central unit so as to protect the central unit against any disturbance occurring in the connecting strip or the external circuits (detectors, actuators), these disturbances consisting more particularly of overloads, short circuits or deficiencies in the external supply.

In addition, the invention has a further aim of adjoining, to the above mentioned input/output circuits, respective circuits for detecting transmission defects resulting more particularly in a non concordance between the signals transmitted and received by the bus of the central unit and the corresponding signals transmitted by the detectors or received by the actuators, this non concordance being more especially due:

to the non execution of an output order, for example because of overloads, short circuits or deficiencies in the external supply not perceived by the central unit;

to an input being forced to zero and to the non supply of an actuator, through disconnection of the terminal strip not perceived by the central unit;

to certain input/output channels being forced to zero or to one, through deficiencies of the interface circuits not perceived by the central unit.

SUMMARY OF THE INVENTION

To reach these results, the invention proposes using, in the input and output interface circuits which provide multichannel connection between the bus of the central unit and the sensors or actuators connected to each of the channels, galvanic decoupling means such for example as optoelectronic couplers, ensuring the exchange between, on the one hand, a so called internal logic signal coming from or transmitted to the bus and, on the other hand, a corresponding so called external signal associated with a sensor or with an actuator corresponding to the respective input/output channel, and means for detecting the non concordance between these two signals.

According to another characteristic of the invention, in the case where a terminal strip is used of the type described above, the device may advantageously comprise means for detecting the initial movement before disconnection, and the final movement, after reconnection of said terminal strip on the corresponding input/output board. In this case, these detection means may be associated with circuits for coding the disconnection signal of the terminal strip.

Furthermore, the device may be designed so that said initial movement signal, before disconnection of the terminal strip, causes, before opening of the output circuits, the resetting of all the outputs of the corresponding input/output board.

It may further comprise a circuit combining the non concordance and initial disconnecting movement or complete connection signals of the terminal strip.

The invention further provides a process for exchanging signals between the central unit and the above described input/output circuits, this process comprising at least the following phases:

a phase in which there is fed to the central unit a signal indicative of the absence of non concordance defect and possibility of the correct connection of the external terminal strip during addressing of each input/output board, a phase in which the exchange by the central unit is finished, following reception of this signal, a phase during which the central unit is warned of a local anomaly when an input/output board addressed by the central unit does not send back said signal indicative of absence of non concordance defect and correct connection of the terminal strip.

BRIEF DESCRIPTION OF DRAWINGS

Embodiments of the invention will be described hereafter, by way of non limitative examples, with reference to the accompanying drawings in which.

DETAILED DESCRIPTION

Figure 1:
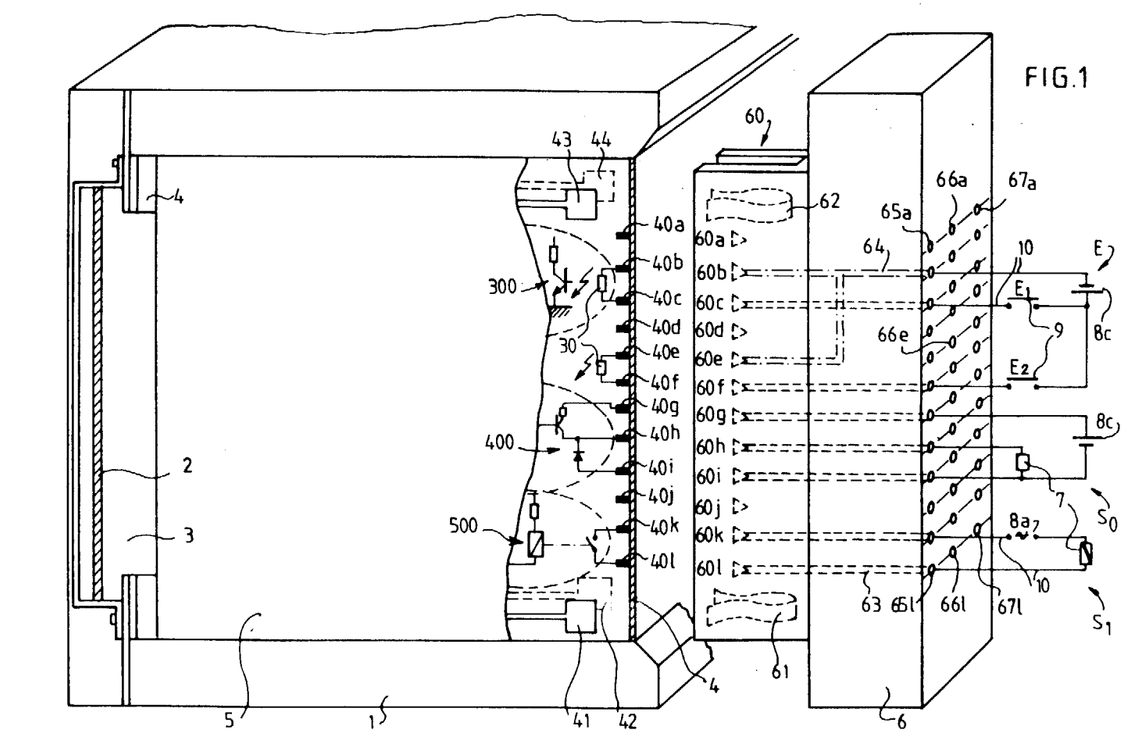
FIG. 1 is a schematical representation, in perspective, with parts cut away, of a controller box equipped with a terminal strip.

FIG. 1 shows a controller box 1 having at the bottom a printed circuit 2 disposed parallel to the bottom of the box. The printed circuit 2 provides a data and address bus, as well as the transmission and control signal lines indicated hereafter. The purpose of the bus is to provide transmission of signals between a central unit (not shown) and input boards and/or output boards The printed circuit 2 which supports the bus is connected by a connector 3 to the rear face of an electronic input or output card 4, mounted in a protection case 5.

Connector 3 is a female clip connector which may receive the connection areas of the printed circuit forming the input or output board 4, orientated towards the bottom of the box.

With a part of case 5 enclosing the electronic card 4 cut away, the connecting areas can be seen on the front face of the printed circuit 4, as well as the part of the electronic circuits which may be mounted on the printed circuit so as to form either a two pole input board 300; or a two pole output board 500, or a threepole output board 400.

For the sake of convenience the three possibilities of circuit configuration have been shown on the same support 4; in actual fact, for an input board with eight DC or AC channels, the printed circuit 4 will comprises eight circuits 300. Similarly, for a two pole AC output board with 12 channels, there will be 12 circuits 500 each ending in a connecting pair 40. Finally, for a board with DC outputs 400 requiring three poles, the board will comprise as many times three areas as there are channels. Each circuit of the type 300, 400, 500 ends in at least one pair of connection areas which have been designated by the references $40_a$ to $40_l$ and which are located on one face of the printed circuit. Furthermore, on each side of the printed circuit, conducting areas (43, 44 and, respectively 41, 42) have been placed at the top and at the bottom, which areas are connected with the bus through, either circuit 300, or circuit 400 or circuit 500.

As will be explained further on, the front part 60 of a terminal strip 6 is connected to the board by introducing said front part in an opening not shown in case 5.

Figure 2:
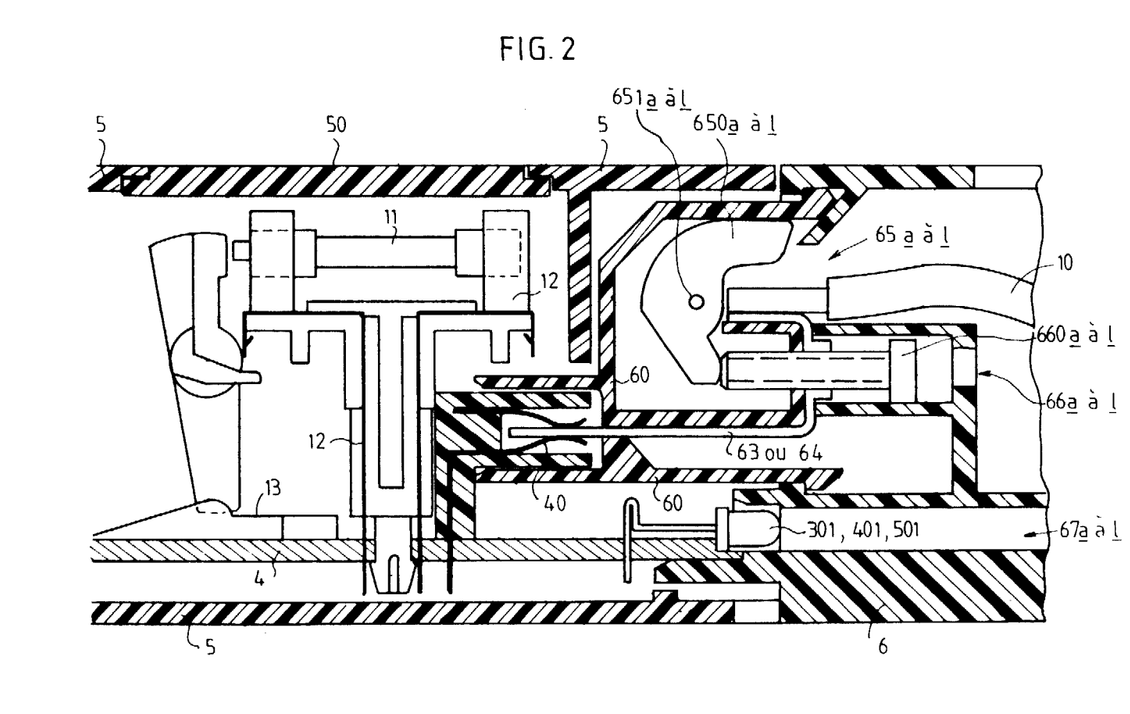
FIG. 2 is a partial schematical section illustrating the fitting of the terminal strip in a box such as the one shown in FIG. 1.

The front part of the terminal strip comprises a succession ($60_a$ to $60_l$) of connecting means adapted for establishing electric contact with the respective conducting areas $40_a$ to $40_l$ of the printed circuit 4. These means may be a female clip connector receiving the front edge of the printed circuit comprising the contact areas $40_a$ to $40_l$. The contact areas $40_a$ to $40_l$ may also be replaced by a female connector 40 which accommodates contact knives 63 or 64, as shown in FIG. 2, or any other possible connector arrangement.

Moreover, on each side of the connection means $60_a$ to $60_l$, a contact lyre 62, 61 has been disposed at the top and at the bottom respectively. These lyres 61, 62 establish an electrical connection between areas 41 42 for the bottom lyre 61, between areas 43, 44 for the top lyre 62, when the terminal strip 6 is connected to the board.

The positions of the lyres 61, 62 and of the contact areas 41, 42; 43, 44 are arranged so that one of the electrical connections between areas 41, 42 and 43, 44 is open before the connection means $60_a$ to $60_l$ are disconnected from areas $40_a$ to $40_l$. Conversely, the connection means $60_a$ to $60_l$ will be connected to areas $40_a$ to $40_l$ before the lyres 61, 62 establish the electrical connections between areas 41, 42, respectively 43, 44, when the terminal strip 6 is plugged into the printed circuit 4.

This arrangement has the advantage of allowing an action for removing the terminal strip to be detected and, consequently, to set the outputs at zero or inhibit the information inputs of the board whose terminal strip is being handled with a view to disconnecting it. Furthermore, when the terminal strip is plugged in, as will be explained further one, the central unit is informed of this fact and may supply the outputs of the board or validate the inputs thus connected.

The connection means $60_a$ to $60_l$ are connected, through direct 63 or shunt 54 electrical connections, to external connection terminals $65_a$ to $65_l$.

Thus, as can be seen in FIG. 1, depending on the configuration of the terminal strip 6, some connections between opposite terminals $60_a$, $65_a$ do not exist, whereas opposite terminals $60_c$, $65_c$ are connected together directly.

For further details on a constructional embodiments of the terminal strip, reference may be made to the French patent application filed on Apr. 15, 1983 under the No. 83 06175 in the name of the La Telemecanique Electrique for: "A shunt terminal strip".

The external terminals $65_b$, $65_c$, $65_f$ are connected by conducting wires 10 to an assembly 9 of input sensors formed for example by end of travel switches. These sensors are fed from a DC voltage source 8c so as to form a positive logic DC input circuit E shown in FIG. 1. The external terminal $65_g$ is connected, by a conducting wire 10, to the positive terminal of a DC voltage source $8_c$ whose negative terminal is connected to terminal $65_l$. An actuator 7 is connected, on the one hand to terminal $65_h$ and, on the other, to terminal $65_i$, so as to form a DC positive logic output circuit $S_o$. The external terminal $65_k$ is connected by a conducting wire 10 to a terminal of an AC voltage source, whose other terminal is connected to a load 7, formed for example by an electromagnet, whose other terminal is connected to the external terminal $65_l$. This circuit forms an AC output circuit $S_l$.

The configuration of a DC negative logic input circuit and of a DC negative logic output circuit is clear from the foregoing, the connections of the DC sources being reversed. At the side of each external terminal $65_a$, $65_l$ is located an orifice $66_a$ to $66_l$ and a light guide $67_a$ to $67_l$. These elements of each assembly: terminal, orifice and light guide are disposed in the same horizontal plane.

In FIG. 2, it can be seen that the orifices $66_a$ to $66_l$ give access to a set screw $660_a$ to $660_l$ which causes cams $650_a$ to $650_l$ to pivot about their axes $651_a$ to $651_l$ for immobilizing the bared parts of the conducting wires 10 against the conducting surfaces of the electrical connections 63 or 64 connecting the conducting wire to a female connector 40 which establishes the connections with the different electronic circuits supported by the board 4.

Fault indicating light-emitting diodes 301, 401, 501, specific or common to several channels, are disposed opposite some of the light guides $67_a$ to $67_l$ and are connected electrically to one of the circuits 300, 400 or 500 depending on the type of board used. Plunger fuses 11 may also be mounted on the board for fusion detection, with fault display and signalling as will be explained further on with reference to FIG. 5.

Figure 3:
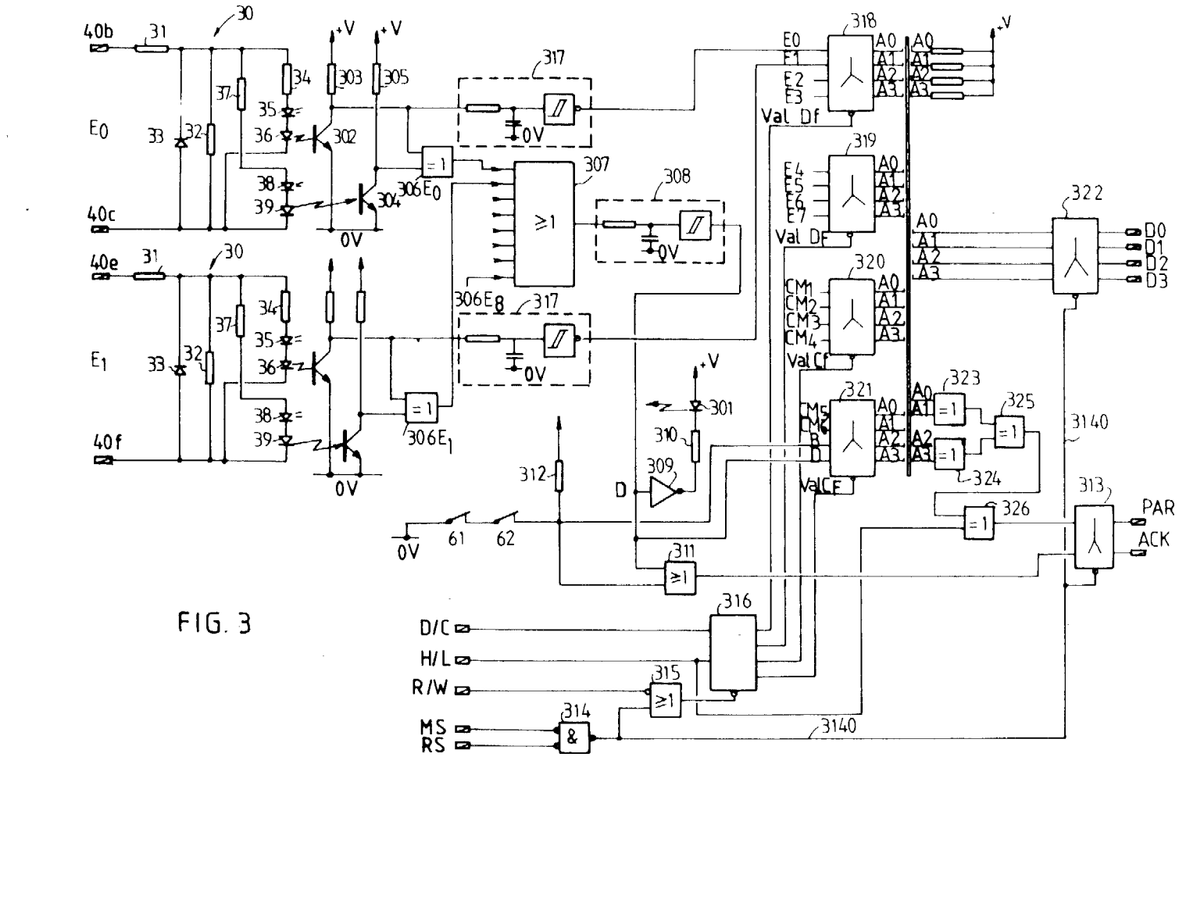
FIG. 3 is a general diagram of an input circuit for transmitting information between the central unit of the controller and the sensors or detectors of the controlled process.

FIG. 3 shows the electronic data transmission and fault signalling circuit of a so called input board, usable with external circuits of the type shown by the reference E in FIG. 1.

In FIG. 1, a two channel input circuit E has been shown, that is to say using two sensors; this circuit is associated, in the example considered, with an internal shunt terminal strip. It is evident, and this will be clear from reading the above mentioned patent application, that the terminal strip could be just as well with direct connection, internal shunt, external shunt or a combination of the three above mentioned possibilities.

In all cases, whatever the type of terminal strip used, that does not change the wiring 300 of board 4. The choice of terminal strip type only modifies the wiring of the external input circuit E.

In FIG. 3, two input channels 30 have been shown decoupled galvanically, by optocouplers, from the circuits 300 connected to the bus of the controller materialized by circuit 2.

The contact area $40_b$ is connected by two resistors 31, 32 in series to the contact area $40c$. The cathode of a Zener protection diode 33 is connected to the common point of the two resistors 31, 32 whereas the anode is connected to terminal 40c.

A first circuit, in parallel across said resistor 32, comprises in series a resistor 34, a light-emitting diode 35 displaying the status of the input circuit and an infrared emitting diode 36 associated as an optocoupler with the phototransistor 302.

A second circuit in parallel across said resistor 32 comprises in series a resistor 37, a threshold balancing diode 38 and an infrared emitting diode 39 associated as an optocoupler with the phototransistor 309. Between the contact areas 40c and $40_b$ is located an input $E_2$ identical to the above described input $E_0$.

The status display diode 35 if the first channel is disposed on the board so as to be situated opposite the light guide $67c$ when the terminal strip is in position, whereas the corresponding diode of the second channel 35 is then disposed opposite guide $67f$.

Thus, the operating status of each input circuit E is displayed by the corresponding light emitting diode 35. The same goes for the other channels in the case of a multiple channel board. The following description will be limited to a single channel.

When input $E_0$ receives, through a validated sensor, the voltage signal forcing it to the logic status "1", the infrared emitting diode 36 lights up and saturates the phototransistor 302 whose emitter is connected to ground and whose collector is loaded by a resistor 303 itself connected to a positive voltage source; simultaneously, because of the same voltage signal applied to $E_0$, the infrared emitting diode 39 lights up and saturates the phototransistor 304 whose emitter is connected to ground and whose collector is loaded by a resistor 305 connected to said positive voltage source. The collectors of the phototransistors 304 and 305 are connected to the two inputs of the "EXCLUSIVE OR" function of circuit 306.

In normal operation, this input circuit 30 saturates or disables the two phototransistors 304 and 305 simultaneously, depending on whether the corresponding external sensor is closed or open; the simultaneity of this switching ensures the permanence of the identity of the signals applied to the "EXCLUSIVE OR" 306 whose output then remains at zero.

On the other hand, should a fault be present, in one of the two parallel legs, for example in leg 34, 35, 36, 302, whose phototransistor remains disabled despite the application of the required voltage at input $E_1$, the signals received by the "EXCLUSIVE OR" 306 differ, which allows a fault signal to be obtained. If, on the contrary, a fault causes the phototransistor 302 to conduct permanen ly, in the absence of a signal at the terminals of the input 30 concerned and, consequently, in the absence of a current in the parallel leg 37, 38, 39, 304, the non concordance of status of the two transistors 302, 304 is detected by the "EXCLUSIVE OR" 306, which then generates a fault signal.

In the two examples above, it has been shown that a fault in leg 34, 35, 36, 302 is detected if it causes non concordance between the logic status present at the terminals of input 30 and the logic status applied, via the optocoupler 302, to the circuits communicating with the central unit over the input/output bus. When comparable faults occur in the parallel leg 37, 38, 39, 304, they cause non concordance between, on the one hand, the logic status intended for the central unit and present on the collector of the optocoupler 302 and, on the other hand, the logic status intended for the control "EXCLUSIVE OR" 306 and present at the collector of the optocoupler 304. This nonconcordance also generates a fault signal at the output of circuit 306.

Summing up the different examples given above, it can be seen that in normal operation the signal present at the collector of phototransistor 304 serves for validating or enabling the signal present at the collector of phototransistor 302 and intended for the central unit; on the other hand, in the case of damage to the signal input interface formed by leg 34, 35, 36, 302 or to the control interface formed by leg 37, 38, 39, 304, the "EXCLUSIVE OR" generates a fault signal which means either that the logic information available for the central unit is erroneous or that the corresponding input circuit 30, 300 is unable to confirm that the logic signal available for the central unit is identical to the one applied to the input.

To simplify the input board shown in FIG. 3 and to limit the additional cost involved by this fault detection, the different "EXCLUSIVE OR" functions 306 of the input interfaces which it combines are all connected to a common "OR" circuit 307 which thus centralizes the possible fault signals from the same board. Of course, a possible variant of this input circuit with incorporated self monitoring would consist in transferring the check for concordance of the signal intended for the central unit and its control signal as far as possible towards the input/output bus; however, such variants would lead to more complex and more expensive boards, without providing a substantial improvement, in so far as the reliability of operation of the controller controlled by such inputs is concerned. In fact, experience acquired in relation to the different components used in these input circuits shows that deterioration of the optocouplers causes the large majority of faults leading to non concordance between the signal at the input terminals and the signal intended for the central unit: this is why the redundance concerning each input to the status control and detection circuit has been limited to two optocouplers monitoring each other mutually 34, 35, 36, 302 and 37, 38, 39, 304.

To avoid untimely transitory alarms which switching time differences in the two logic legs connected to each "EXCLUSIVE OR" might cause, the output of the "OR" 307 is filtered by circuit 308, which comprises an integrator followed by a trigger and only sends a logic "1+ to line D in the case of significant non concordance.

On the one hand, this logic "1" is used locally on the board for displaying the presence of a fault by energizing the light emitting diode 301 through the amplifier 309 and resistor 310; on the other hand, this line D is also connected to one of two inputs of another "OR" circuit 311, whose output signal is fed to the ACK terminal for connection to the bus when the interface 313 is enabled.

The other input of this "OR" circuit 311 receives line B, which is connected to a voltage source +V through resistor 312 and set to zero volt through contacts 61 and 62. These contacts 61 and 62 symbolize the electrical connections formed between areas 41, 42 on the one hand, and 43, 44 on the other by the lyres 61, 62 of FIG. 1.

The terminal strip 6 in position on board 4 holds line B at zero volts through the lyres 61, 62: during disconnection of this terminal strip from said board and before connections 40-60 are broken, at least one of the lyres 61 and 62 sets line B at zero, on which appears a logic "1" signal transmitted by the "OR" 311 and present at the terminal ACK for connection to the bus when the interface circuit 313 is enabled.

Considering the switching conditions thus described for lines D and B, it can be seen that the signal appearing on the terminal ACK, when the inter*ace 313 is enabled, is a logic "0" when the terminal strip 6 is in position and when no non concordance is detected in the different input channels of the board; on the other hand, a beginning of terminal strip disconnection or any non concordance will cause a signal "1" to appear at said terminal ACK when said interface 313 is enabled: this signal ACK is therefore usable by the central unit so as to take into account only the input data coming from boards having no non concordance fault and whose external connection terminal is in position. The above mentioned lines B and D are further connected to two inputs having the same name of the interface circuit 321 for allowing the central unit to identify a fault by reading each of the signals B and D.

After this detailed description of the elaboration and local processing of the "concordance fault" (D) and "terminal strip disconnection" (B), signals, the rest of the input interface functions shown in FIG. 3 will now be described. It has already been shown how the application of a voltage signal representing the logic "1" level to the terminals 40b, 40c of the input $E_0$ saturates the phototransistor 302 and then causes a logic "0" to appear between its collector and the zero volt.

For eliminating short disturbances, such as those caused by the bouncing of sensor contacts and certain oscillations generated by the logic circuits receiving input signals which are too slow, the logic signal of the collector of phototransistor 302 is filtered and shaped by an inverting trigger in circuit 317. The logic "1" which results from this processing is applied to the input $E_0$ of the interface 318, which also receives the logic signals $E_1$, $E_2$, and $E_3$ after shaping by identical circuits.

Similarly, the interface circuit 319 receives, after shaping, the logic signals $E_4$, $E_5$, $E_6$ and $E_7$.

The interfaces 320 and 321 further receive six fixed logic levels $CM_1$ to $CM_6$ forming a code specific to each type of input or output board, which signals the central unit may read for identifying or verifying the input/output configuration present on the bus; after this description of the elaboration of the four words of four bits ($E_0$ $E_1$ $E_2$ $E_3/E_4$ $E_5$ $E_6$ $E_7/CM_1$, $CM_2$, $CM_3$, $CM_4/CM$ $CM_6$, B, D) available respectively at the input of the interface circuits 318, 319, 320, 321, the operation of the circuits shown in FIG. 3 will be explained during interrogation thereof by the central unit. For reading the status of the inputs $E_0$ to $E_7$, or the status word of the board formed from module codes $CM_1$ to $CM_6$ and signals "B" and "D", the central unit begins by selecting the address of the input board concerned while setting to zero the signals from the bus RS and MS applied to the two inverting inputs of the "NAND" circuit 314 which generates a logic zero which the input of the "OR" circuit 315 receives while its inverting input is set by the signal R/W coming from the central unit; this circuit 315 generates a "0" for enabling the decoder circuit 316, which the central unit uses through the combined signals D/C and H/L for individually selecting each four bit word $E_0$ to $E_3$, $E_4$ to $E_7$, $CM_1$ to $CM_4$, $CM_5$ to D to be communicated to the bus $D_0$ to $D_3$ through its own interface 312, 319, 320 or 321 and the common interface 322.

The table of verity of this selection circuit 316 is as follows:

| MS & RS to zero R/W to 1 | D/C | H/L | validation signal (active to zero) |
| --- | --- | --- | --- |
| reading of low weight data $E_0$ to $E_3$ | 0 | 0 | Val $D_f = 0$ |
| Reading of high weight data $E_4$ to $E_7$ | 0 | 0 | Val $D_F = 0$ |
| Reading of low weight module codes $CM_1$ to $CM_4$ | 1 | 0 | Val $C_f = 0$ |
| Reading of high weight module codes codes $CM_5$ to D | 1 | 1 | Val $C_F = 0$ |

The reading of the inputs $E_0$ to $E_3$ will now be described in detail: the above described validation of the interface 318 applies this four bit word both to the input of the bus interface circuit 322 and to the parity calculating device formed by the "EXCLUSIVE OR" circuits 323, 324, 325; the "EXCLUSIVE OR" 326 calculates the parity of five binary signals: the signal H/L associated with the four bits of the word presented on the bus through enabling of the interface 322. When the MS and RS signals select this board, as was explained above the output of circuit 314 passes to zero; the line 3140 transmits this zero to the interfaces 313 and 322 and validates them.

The central unit then reads simultaneously the four bit word $E_0$ to $E_3$ on lines $D_0$ to $D_3$, the parity calculated at the source "PAR" and the signal ACK which is at zero when the terminal strip is in position and when no fault is detected in this input board.

On reception, the central unit calculates the parity of the word formed by the four bits $D_0$ to $D_3$ present on the bus with this signal H/L which it applies to said bus and compares this calculated parity on arrival with that transmitted by the line "PAR": it stores this word $D_0$ to $D_3$ in the input/output image memory only if the parities coincide and if the signal ACK equals 0; in the other cases, the central unit is warned, in real time, of an anomaly and precedes as follows:

If ACK=0 and if it ascertains a parity divergence, it keeps the data stored in the input/output image memory at the last read out which it enabled and, according to the system programming choice made by the designer, immediately proceeds, or during the next cycle, to a further reading of this same data; if ACK remains at "1" during this reading and if the parity check finds a coincidence, the central unit is warned by this signal ACK of the fact that the data present on the bus is doubtful; by means of the programme, the designer of the controller will choose a procedure for rapid shut down or for maintaining a reduced operation with fault signalling depending on the address of the board concerned, that is to say depending on the impact of possible false information coming from the corresponding inputs on the correct operation and reliability of the cycle of the automatic device controlled.

The central unit similarly proceeds to read the inputs $E_4$ and $E_7$ and, if necessary, the different module codes by selecting the desired word by the corresponding combination H/L, D/C indicated by the table of verity of the decoder 316; each of these read outs gives rise to the same enabling checks, because of the signals PAR and ACK emitted with the selected word.

To sum up, the procedure and the devices thus described allow a programmable controller connected to input boards of the type shown in FIG. 3 to have permanently available reading accessible signals representing the operating status D and the presence of the external connection terminal strip and before validation of each input word, checking of the correct operating status of the interrogated board and the conformity of parities between words emitted and received. For economic reasons, a partial version of the solution shown in FIG. 4 may be preferred, which version comprises neither the input redundants 37, 38, 39, 40, nor the concordance check 306, nor the use thereof 308, 309, 310, 301; with the thus simplified diagram the signal "ACK" is only conditioned by the terminal strip connection signal B.

Figure 4:
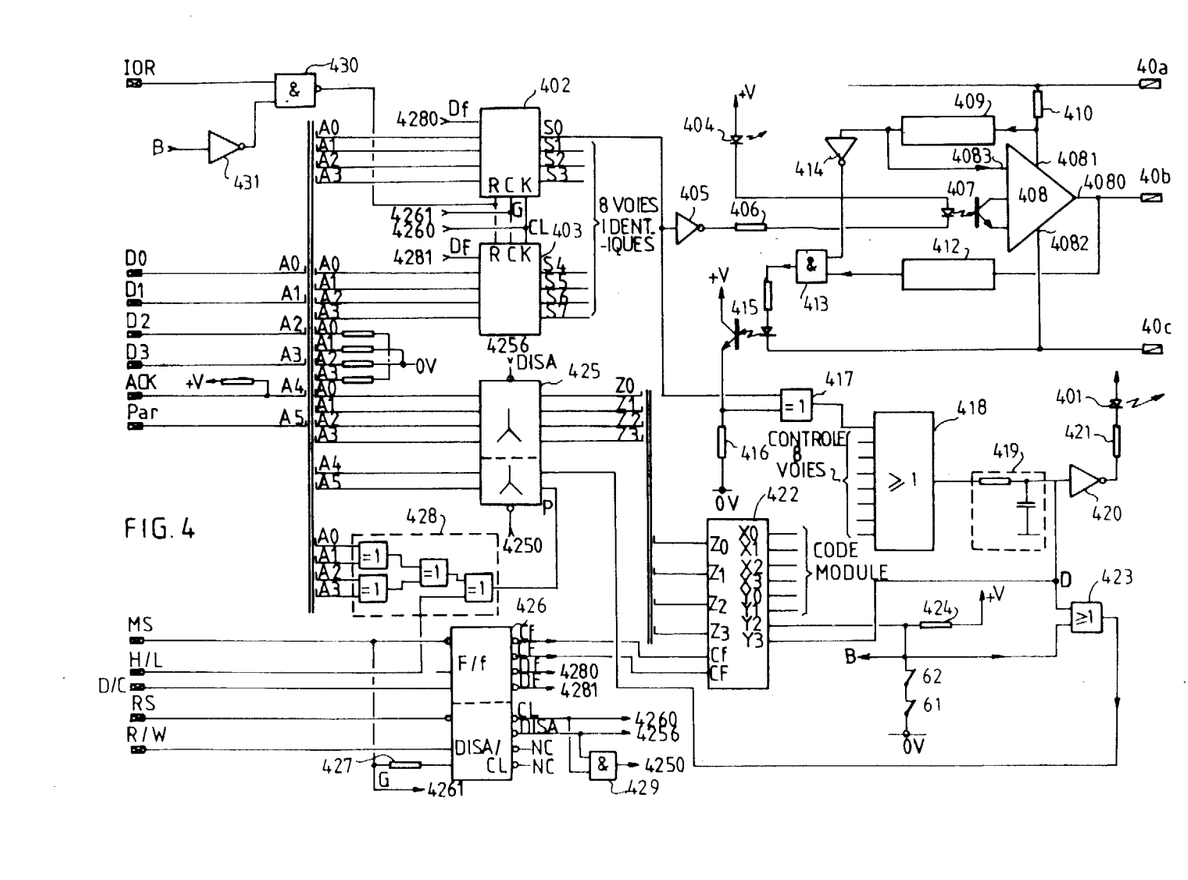
FIG. 4 is a general diagram of a threepole input/output circuit for transmitting information between the central unit of the controller and the actuators of the controlled process.

FIG. 4 gives the diagram of an eight channel DC output board of the "three wire" type, that is to say comprising, for each output such as $S_O$, a power supply area 40a (external +V), an output area to the load 40b a third area 40c connecting the other pole of the amplifier 408 to the zero volt of the external power supply.

On the bus side, this board comprises connections required for the same signals as the input board of FIG. 3, but its operation is different: contrary to the inputs which only operate for reading, the output boards of the pattern shown in FIG. 4 are accessible for writing so as to control the status of each output and for reading so as to acquire or check the module code and the above defined information B and D (terminal strip presence, absence of fault).

The selection of the different operating modes of this board is effected from the signals:
MS Module selection
RS Rack selection
R/W Reading/writing
D/C Data/code
H/L High weights/low weights These signals are clarified by the decoder circuit 426 according to the following table of verity:

| MS and RS at zero | R/W | D/C | H/L | Writing enable signal and conditions |
|---|---|---|---|---|
| Low weight data selection $D_0\,D_3$ | 0 | 0 | 0 | CL = 0<br>$D_f = 0$<br>writing in<br>$S_0$ to $S_3$ if RS<br>rises before MS |
| High weight data selection $D_4$ to $D_7$ | 0 | 0 | 1 | CL = 0<br>$D_F = 0$<br>writing in $S_4$<br>to $S_7$ if RS<br>rises before MS |
| Low weight code reading | 1 | 1 | 0 | DISA = 0<br>$C_f = 0$ |
| High weight code reading | 1 | 1 | 1 | DISA = 0<br>$C_F = 0$ |

In a low weight writing exchange, the central unit presents on the wires of the bus $D_0$ to $D_3$ the signals intended for controlling the outputs $S_0$ to $S_3$ and selects the board, the outputs concerned and the writing mode by making RS and MS=0, H/L and D/C=0, R/W=0.

When these signals appear on the corresponding areas of the board of FIG. 4, the four "EXCLUSIVE OR"s of circuit 428 calculate the parity received from signals $D_0$ to $D_3$ combined with H/L; receiving the signal CL=O from the decoder 426, the AND circuit 429 generates, at its output 4250, a zero signal which enables channels $A_4$ and $A_5$ of the interface 425: the selected card then sends back to the central unit, over $A_5$, the parity calculated from the signals received and, over $A_4$, the signal ACK coming from the "OR" circuit 423, a zero signal when the terminal strip is in position and when no fault is detected on the board.

Receiving in return this parity of the signals present at the inputs of the registers storing the status of the outputs 402, 403, the central unit compares it with the parity which it has itself calculated at the source: if these parities coincide and if the signal ACK is at zero, the central unit enables this writing exchange while storing the signals $D_0$ to $D_3$ in the flip flops $S_0$ to $S_3$ of circuit 402.

For validating this storage, the central unit causes the signal RS to rise before signal MS, which causes the signal CL to rise which is applied by line 4260 of circuit 402 while the signal G (=MS) received on line 4261 by the same circuit is still at O; this order of rising of signals G and CL applied to circuit 402 stores the data present on lines $D_0$ to $D_3$ in flip flops $S_0$ to $S_3$, in the place of the previously received data. On the contrary, should a parity error be ascertained by the central unit, this latter inhibits the data present at the inputs of register 402 by causing the signal MS (=G) to rise before RS so before L; this sequence allows the controller to keep the outputs $S_0$ to $S_3$ in the status corresponding to the orders received during the last enabled exchange for updating them only with the data whose correct transmission has been ascertained in real time, by the central unit.

Before considering the cases in which the board of FIG. 4 selected by MS and RS has one or more anomalies preventing it from sending the signal ACK=0 back to the central unit, the complete description of the output circuit connected to the connection $S_0$ of register 402 will be finished. When $S_0$ is at level 1, inverter 405 supplies the series circuit starting from +V and comprising the light emitting diode 404, the infrared emitting diode of the optocoupler 407 and the resistor 406; the control signal $S_0$ stored locally by register 402 is then displayed by diode 404 via the light guide 67b of the terminal strip and is transmitted to the output amplifier 408 by the optocoupler 407.

This amplifier 408 is connected to an external DC supply through areas 40a (+) and 40c and it connects area 40b, through resistor 410 to area 40a when the optocoupler 47 is conducting;

In normal operation, when $S_0=1$, the load connected between areas 40b and 40c receives a voltage very close to that of the external supply (the current sensor 410 being a low value resistor); the overcurrent detector 409 then generates a zero which is transformed into 1 by the inverter 414, whereas the voltage control 412 associates a 1 signal with the presence of voltage between 40b and 40c; the AND circuit 413 then generates a 1 signal which energizes the optocoupler 415, through the resistor 4150 and in series with its infrared emitting diode; its phototransistor then supplies with power the load resistor 416 in its emitter, which generates a 1 on one of the inputs of the "EXCLUSIVE OR" 417, whose other input receives directly the signal $S_0$; the concordance of the command $S_0=1$ and of the execution of this command by amplifier 408 generates the two "1"s at the inputs of circuit 417, whose output remains zero. Similarly, when the status stored in register 402 is $S_0=0$, the optocoupler 407 and amplifier 408 remain disabled; this same exclusive "OR" 417 then ascertains concordance between command and execution and its output still remains at zero. On the other hand, when a load anomaly causes an overcurrent detected by circuit 409, this circuit generates a 1 which brings into play the current limiter of amplifier 408 by acting on the connection 4083; this disturbance of execution of the command $S_0=1$ is transmitted through the inverter 414 to the "AND" 413, which output passes to zero, which disables the optocoupler 415; the "EXCLUSIVE OR" 417 then receives different signals; it generates a 1 corresponding to a non concordance fault between control signal $S_0$ and output status 40b of the corresponding channel.

Similarly, if the absence of external voltages between areas 40a and 40c, or any other fault at this output, prevents the voltage from appearing between areas 40b and 40c, despite the presence of a command $S_0=1$, the circuit 412 ascertains this absence of voltage and generates a zero, which therefore disables the optocoupler 415 and again generates a fault signal at the output of the "EXCLUSIVE OR" 417. Furthermore, in the case of a reduced output remaining conducting despite a zero command signal, the non concordance again generates D. For limiting the additional cost of these control circuits, the fault signals from the circuits 417 of each channel are all grouped together by the "OR" circuit 418, whose output is filtered by the resistance-capacity circuit 419 for avoiding transitory alarms due to the switching times of the components; the signal D common to the eight channels of the board is inverted by circuit 420 and controls the fault display light emitting diode 401 through the resistor 421; this fault display diode, of a different color, is mounted opposite a free light guide of the terminal strip.

Furthermore, this signal $D=1$ sets the output of the "OR" 423, which prevents the board from sending back a signal ACK=0 on its selection by MS and RS=0; the central unit is therefore informed of an anomaly in the execution of its orders by the output board concerned and reacts according to the fault procedure adopted by the designer with respect to the eight outputs concerned (maintenance in reduced operation with alarm or fault shutdown of the whole of the controller). It will also be noted that the signal D is applied at $Y_3$ as an element of the module code which the central unit may read under the conditions described further on. The role of the terminal strip presence contacts 61 and 62 will now be explained:

When disconnection of the external connection terminal strip of the board of FIG. 9 is begun whereas its output $S_0$ is conducting, one of the contacts 61, 62 opens first and B passes to 1; the output of the inverter 431 then passes to zero and the "NAND" 430 causes R to pass to 1, which resets the eight channels of registers 402 and 403 before the output connections 40/60 are opened; this automatic resetting at the beginning of disconnection of the terminal strip avoids then on load breaks which might damage the connections 40/60.

This signal B is furthermore used by the "OR" circuit 423 for warning the central unit of an anomaly while preventing the board selected by MS and RS=0 from responding, for the signal ACK then remains at 1. It will be further noted that this same signal B is applied at $Y_2$ as element of the module code accessible by the central unit in the reading mode.

The preceding detailed description relating to the writing functions of the board of FIG. 4 and, more especially, of its channel $S_0$, is applicable to the seven other outputs, providing that the selection H/L is respected for addressing the respective commands in accordance with the table of verity given for the circuit 426.

The operation of the devices used during reading will now be explained; On the output board of FIG. 4, the elements accessible by the central unit in the reading mode form the status word of said board, which comprises the six bits of the module code specific to the output function concerned (type, modularity etc) and the previously described terminal strip B and fault D signals.

If we consider for example the reading of the last four above enumerated bits, selection thereof is made by the central unit in accordance with the table of verity of decoder 426 by the signals for selecting this board MS and RS=0, R/W, D/C and H/L=1; this decoder then generates DISA and CF=0.

The signal $C_F=0$ applies the word to be read to the four outputs $2_0$ to $2_3$ of the interface 422, which outputs are connected to the inputs of the same name of the interface 425; the signal DISA=0 applied by line 4256 enables the interface 425 and this word appears on lines $A_0$ to $A_3$ and the areas $D_0$ to $D_3$ connected to the bus.

Circuit 422 then calculates the parity of this word in combination with the signal H/L=1 and this parity at the source is applied to line PAR of the bus via the line A5 of the interface 425, the enabling of the outputs A4 and A5 of which is effected by the signal DISA=0 via the AND circuit 429 which retransmits this zero to the connection 4250 of said interface circuit; such enabling connects the output of the "OR" circuit 423 to the line ACK of the bus, which will then be at zero only in the absence of fault D and only if the terminal strip is in position B=0. Receiving over the bus the data $D_0$ and $D_3$ and the parity calculated at the source, it calculates the parity received in combination with H/L=1 and only enables this configuration status check reading if these parities are identical. Under the same conditions, except for the signal H/L being reset to zero, the central unit effects reading of the four lowest weight bits of the module code associated with their parity at the source and with the signal ACK if B and D=0.

It will be noted that the absence of ACK=0 signals an anomaly to the central unit but does not prevent it either from reading the status word nor from writing the outputs which operate on a board having anomalies and a signal D=1; only disconnection of the terminal strip prevents reading of the outputs by forcing them to zero.

Figure 5:
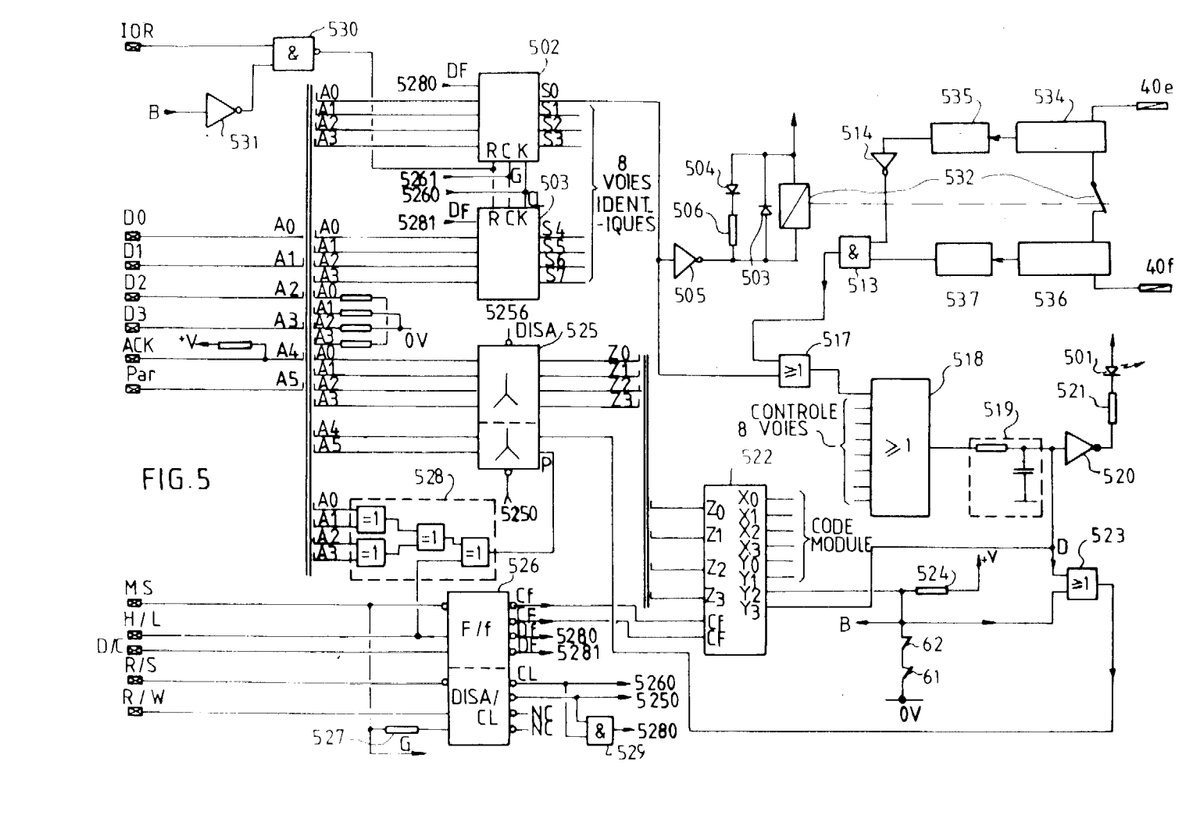
FIG. 5 is a general diagram of a twin pole input/output circuit whose output element, for controlling the process actuators, consists of a relay.

FIG. 5 gives one embodiment of an eight channel board with relay for AC current, using only two connection terminals per channel and comprising the same operating checks as that of FIG. 4.

For designating the elements and circuits identical to those in FIG. 4, the hundreds figure has been changed from 4 to 5.

The description of FIG. 5 will be limited to the new devices which it comprises and whose numbers have been changed. The new output circuit concerned is entirely situated between the output of the inverter 505 and the inputs of the monitoring circuit 513 and 514.

The output signal of this inverter amplifier 505 controls a relay 532 whose coil is mounted in parallel across a retrieval diode and whose contact is connected in series with an overcurrent detector 534 and an output current monitoring circuit 536 between areas 40c and 40b.

When the output $S_0$ of register 502 is at 1, the relay 532 is energized; its status is displayed by the light emitting diode 504 and its contact closes the above mentioned series circuit between areas 40 and 40b. If the external circuit, which comprises a power supply and an output controlled actuator, operates normally, the overcurrent detector 534 remains zero, whereas the output current monitor 536 passes to 1; the "EXCLUSIVE OR" 517 then ascertains the concordance between the command signal $S_0$ and its execution.

As before, in the different cases of non concordance, said circuit 517 generates a fault signal which is displayed and used under the same conditions.

Figure 6:
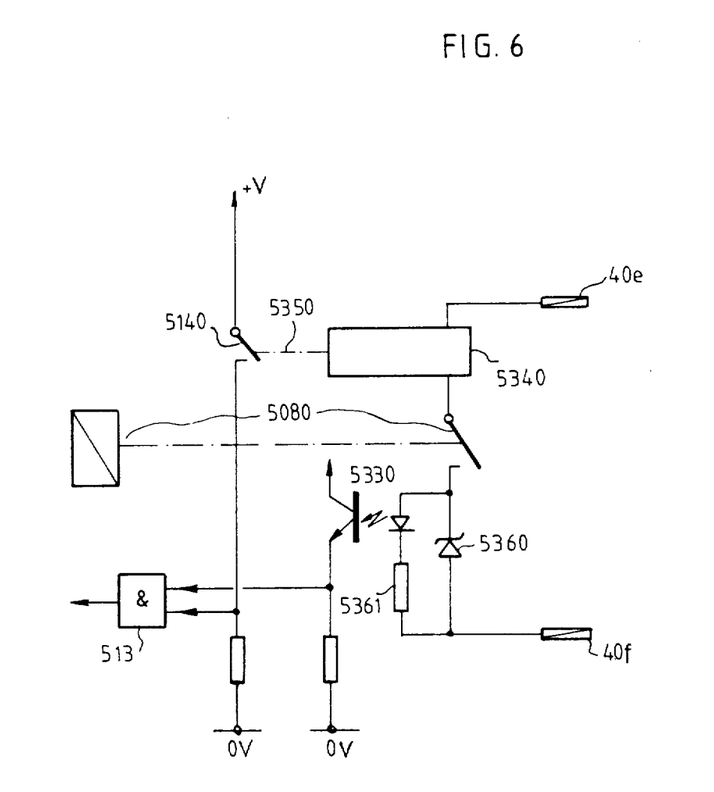
FIG. 6 is the diagram of a constructional variant of the output stage of the input/output circuit shown in FIG. 5.

FIG. 6 illustrates one embodiment of the functions 534 and 536, using an overcurrent detector formed by a plunger fuse 5340 which actuates a contact 5140 through an insulating piece 5350 and an output current check provided by a low voltage series Zener diode 5360, in parallel with the emitting diode of an optocoupler 5330 and a resistor 5361.

Since the rest of the diagram of FIG. 5 is identical to the one shown in FIG. 4, we find therein all the elements for dialoging with the central unit, the operation of which elements has been described above.

We claim:

1. An input/output device for a programmable controller comprising a central unit connected to a bus having a determined number of data lines, said device comprising on at least one printed circuit board at least one input connecting element adapted to be connected a sensor so as to receive a state signal from said sensor, at least one output connecting element adopted to be connected an actuator so as to transmit a control signal to said actuator, input/output connecting elements which can be connected to said bus so as to receive, from the central unit, an output signal which must correspond to the control signal, and to transmit to said bus an input signal corresponding to the state signal, and at least first and second electronic channels which respectively connect said input/output connecting elements to said input connecting element and to said output connecting element, these first and second electronic channels forming two respective logic interfaces between said bus, said corresponding sensor and said corresponding actuator, wherein:

i said first electronic channel comprises, a first galvanic decoupling means which is connected to said input connecting element so as to receive the state signal and to transmit to said input/output connecting elements a corresponding first internal logic signal;

a second galvanic decoupling means connected to said input connecting element so as to receive the state signal and to generate a first external correlative logic signal corresponding to the said state signal;

a first non concordance detection circuit connected to said first and second galvanic decoupling means for detecting non concordance between the said first internal logic signal and the said first external correlative signal, and for generating a first non concordance signal, and ii said second electronic channel comprises: a third galvanic decoupling means which is connected to said input/output connecting elements so as to receive said output signal and to transmit to said output connecting element a second internal signal corresponding to said control signal;

a fourth galvanic decoupling means which is connected to the output connecting element and which comprises first detecting means for detecting said output signal and means for generating from this detection, a second external correlative signal representative of the control signal, and a second non concordance detection circuit connected to said third and fourth galvanic decoupling means for detecting non concordances between said second internal signal and said second external correlative signal, and for generating a second non concordance signal, said first and second non concordance signals being transmitted to the central unit through at least one first additional connecting element provided on the circuit board.

2. A device according to claim 1, wherein said first detecting means comprises a load voltage detection means.

3. A device according to claim 1, wherein said output connecting element includes a current limiter and means signalling the intervention of said current limiter.

4. A device according to claim 1, wherein said output connecting element includes a plunger fuse having means for signalling a fusion of said plunger.

5. A device according to claim 1, which comprises OR circuit having at least first and second input terminals respectively connected to said non first and second concordance detection circuits and one output terminal connected to means for signalling non concordances detected by one of said non concordance detection circuits.

6. A device according to claim 1, further comprising signalling means connected to at least one of said non concordance detection circuits for local display of the non concordances.

7. A device according to claim 1, further comprising a logic coding circuit connected to the non concordance detection circuits, for coding said first and second non concordance signals and for transmitting these signals, once coded, to the input/output connecting elements.

8. A device according to claim 1, wherein said input connecting element and said output connecting element comprise at least an external connection strip removably connected on said board, said external connection strip comprising second detecting means for detecting the initial movement before disconnection and the final movement after reconnection of the said external connection strip on the said board, said second detecting means comprising means generating disconnection/reconnection signals, means for coding said disconnection/reconnection signals and means for transmitting, once coded, said disconnection/reconnection signals to the central unit.

9. Device according to claim 8, wherein said second detecting means are connected to a reset means connected to said output connecting element for resetting of said output connecting element; before disconnection of the external connection strip.

10. A device according to claim 8, wherein said transmitting means comprises an OR circuit having input terminals which respectively receive the non concordance signals and the disconnection/reconnection signals, and an output terminal connected to the central unit through the said additional connecting element.

11. A device according to claim 1, wherein said board comprises a number of channels greater than the number of data lines of the bus, said device further comprising multiplexing means which connect said channels to said data lines of the bus.

* * * * *